(12) United States Patent
Ando (10) Patent No.: US 9,319,877 B2
(45) Date of Patent: Apr. 19, 2016

(54) SECRET KEY GENERATION (75) Inventor: Megumi Ando, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 465 days.

(21) Appl. No.: 12/974,348

(22) Filed: Dec. 21, 2010

(65) Prior Publication Data

US 2012/0159147 A1    Jun. 21, 2012

(51) Int. Cl.
| | |
|---|---|
| H04L 29/06 | (2006.01) |
| H04W 12/04 | (2009.01) |
| H04L 9/08 | (2006.01) |
| H04L 9/00 | (2006.01) |

(52) U.S. Cl.
CPC ............ H04W 12/04 (2013.01); H04L 9/0875 (2013.01); H04L 63/06 (2013.01); *H04L 9/001* (2013.01); *H04L 9/08* (2013.01); *H04L 9/0861* (2013.01); *H04L 29/06* (2013.01); *H04L 2209/00* (2013.01); *H04L 2209/04* (2013.01)

(58) Field of Classification Search
CPC ..... H04L 9/001; H04L 9/0861; H04L 9/0875; H04L 2209/00; H04L 2209/04; H04L 9/08; H04L 63/06; H04L 63/061; H04W 12/04
USPC .................................... 713/150; 380/255, 263
See application file for complete search history.

(56) References Cited

U.S. PATENT DOCUMENTS

| | | | |
|---|---|---|---|
| 5,479,513 A | 12/1995 | Protopopescu et al. | |
| 5,680,462 A * | 10/1997 | Miller ..................... | H04L 9/001 380/263 |
| 6,031,913 A | 2/2000 | Hassan et al. | |
| 6,064,738 A * | 5/2000 | Fridrich ................. | H04L 9/0891 380/243 |
| 6,792,111 B1 * | 9/2004 | Italia ....................... | H04L 9/001 380/206 |
| 7,006,633 B1 | 2/2006 | Reece | |
| 7,124,434 B2 | 10/2006 | Higurashi | |
| 7,181,017 B1 * | 2/2007 | Nagel et al. .................... | 380/282 |
| 7,421,075 B2 | 9/2008 | Hassan et al. | |
| 7,489,781 B2 | 2/2009 | Klassen et al. | |
| 7,502,472 B2 | 3/2009 | Depta | |
| 7,587,047 B2 | 9/2009 | Crandall et al. | |
| 7,702,102 B2 | 4/2010 | Doebrich et al. | |
| 8,462,951 B2 * | 6/2013 | Steer et al. ..................... | 380/270 |
| 2002/0164032 A1 * | 11/2002 | Short ....................... | H04L 9/001 380/277 |
| 2003/0115515 A1 * | 6/2003 | Curtis et al. .................. | 714/712 |
| 2003/0182246 A1 | 9/2003 | Johnson et al. | |
| 2004/0202326 A1 * | 10/2004 | Chen ....................... | H04L 9/001 380/263 |
| 2004/0223616 A1 | 11/2004 | Kocarev et al. | |
| 2005/0271207 A1 | 12/2005 | Frey | |
| 2006/0171540 A1 | 8/2006 | Lee et al. | |

(Continued)

OTHER PUBLICATIONS

"The generation of shared cryptographic keys through full duplex channel impulse response estimation at 60 GHz", Forman, M.A., Microwave Conference Proceedings (APMC), 2010, pp. 1292-1295.*

(Continued)

*Primary Examiner* — Jayesh Jhaveri (74) *Attorney, Agent, or Firm* — Burns & Levinson, LLP; Steven M. Mills (57) ABSTRACT

The technology includes a method for generating a secret key. The method includes receiving initialization data, the initialization data includes an initialization packet and a transmission path channel response; generating sample data based on the transmission path channel response; and generating a secret key based on the sample data utilizing a chaotic map.

19 Claims, 6 Drawing Sheets

(56) References Cited

U.S. PATENT DOCUMENTS

| | | | |
|---|---|---|---|
| 2007/0036353 A1* | 2/2007 | Reznik | H04B 7/0434 380/30 |
| 2007/0058808 A1* | 3/2007 | Rudolf et al. | 380/44 |
| 2007/0165845 A1* | 7/2007 | Ye | H04L 9/0875 380/30 |
| 2007/0277035 A1 | 11/2007 | Patel et al. | |
| 2008/0063185 A1* | 3/2008 | Alpcan | H04L 9/001 380/28 |
| 2009/0092251 A1* | 4/2009 | Domosi | 380/255 |
| 2009/0138715 A1 | 5/2009 | Xiao et al. | |
| 2009/0225982 A1 | 9/2009 | Yener et al. | |
| 2010/0034377 A1* | 2/2010 | Kamel Ariffin et al. | 380/46 |
| 2010/0080386 A1* | 4/2010 | Donnangelo et al. | 380/256 |
| 2012/0106739 A1* | 5/2012 | Ly et al. | 380/270 |
| 2012/0237031 A1* | 9/2012 | Donnangelo et al. | 380/256 |
| 2012/0249302 A1* | 10/2012 | Szu | 340/10.1 |
| 2013/0159698 A1* | 6/2013 | Al-Dweik et al. | 713/151 |
| 2013/0170641 A1* | 7/2013 | El Assad et al. | 380/44 |

OTHER PUBLICATIONS

"Radio-telepathy: extracting a secret key from an unauthenticated wireless channel", Suhas Mathur, MobiCom '08: Proceedings of the 14th ACM international conference on Mobile computing and networking, Sep. 2008.*

Jeff Foerster, Sub-committee Chair; IEEE P802.15 Working Group for Wireless Personal Area Networks (WPANs); Channel Modeling Sub-committee Report Final; Feb. 7, 2003.

Yingbin Liang; NSF Abstract No. 0846028; Secure Communication via Source and Channel Randomness; 2009.

Bulent Yener; NSF Abstract No. 0831366; CT-ISG Key Generation from Physical Layer Characteristics in Wireless Networks; 2008.

Jianquan Xie et al.; E.I. Compendex No. 20093012206769; An encryption algorithm based on transformed logistic map; Proceedings—International Conference on Networks Security, Wireless Communications and Trusted Computing, NSWCTC 2009; Jul. 21, 2009.

Rudolf Ahlswede et al.; Common randomness in information theory and cryptography. Part I: secret sharing; IEEE Transactions on Information Theory; vol. 39, No. 4; pp. 1121-1132; 1993.

Moe Z. Win et al.; Impulse Radio: How It Works; IEEE Communications Letters; vol. 2, No. 2; Feb. 1998.

Moe Z. Win et al.; Ultra-Wide Bandwidth Time-Hopping Spread-Spectrum Impulse Radio for Wireless Multiple-Access Communications; IEEE Transactions on Communications; vol. 48, No. 4; Apr. 2000.

Moe Z. Win et al.; Characterization of Ultra-Wide Bandwidth Wireless Indoor Channels: A Communication-Theoretic View; IEEE Journal on Selected Areas in Communications; vol. 20, No. 9; Dec. 2002.

Dajana Cassioli et al.; The Ultra-Wide Bandwidth Indoor Channel: From Statistical Model to Simulations; IEEE Journal on Selected Areas in Communications; vol. 20, No. 6; Aug. 2002.

Andreas F. Molisch et al.; A Comprehensive Model for Ultrawideband Propagation Channels; IEEE Globecom; 2005.

Andreas F. Molisch; Ultrawideband Propagation Channels-Theory, Measurement, and Modeling; Mitsubishi Electric Research Laboratories; TR 2005-037; Dec. 2005.

Andrea Ridolfi et al.; Ultrawide Bandwidth Signals as Shot Noise: A Unifying Approach; IEEE Journal on Selected Areas in Communications; vol. 24, No. 4; Apr. 2006.

Joon-Yong Lee et al.; Ranging in a Dense Multipath Environment Using an UWB Radio Link; IEEE Journal on Selected Areas in Communications; vol. 20, No. 9; Dec. 2002.

Watcharapan Suwansantisuk et al.; On the Performance of Wide-Bandwidth Signal Acquisition in Dense Multipath Channels; IEEE Transactions on Vehicular Technology; vol. 54, No. 5; Sep. 2005.

Adrian Perrig et al.; Security in Wireless Sensor Networks; http://escholarship.org/uc/item/5720b6ng; Communications of the ACM; vol. 47, No. 6; Jun. 2004.

Watcharapan Suwansantisuk et al.; Multipath Aided Rapid Acquisition: Optimal Search Strategies; IEEE Transactions on Information Theory; vol. 53, No. 1; Jan. 2007.

Z.N. Low et al.; Pulse Detection Algorithm for Line-of-Sight (LOS) UWB Ranging Applications; IEEE Antennas and Wireless Propagation Letters; vol. 4; 2005.

Davide Dardari et al.; Threshold-Based Time-of-Arrival Estimators in UWB Dense Multipath Channels; IEEE Transactions on Communications; vol. 56, No. 8; Aug. 2008.

Z. Zhang et al.; BA-POC-Based Ranging Method With Multipath Mitigation; IEEE Antennas and Wireless Propagation Letters; vol. 4; 2005.

Robert Wilson et al.; Channel Identification: Secret Sharing using Reciprocity in Ultrawideband Channels; Mar. 18, 2006.

Daniel Halperin et al.; Security and Privacy for Implantable Medical Devices; Pervasive Computing, IEEE Computer Society; vol. 7, No. 1; Jan.-Mar. 2008.

Daniel Halperin et al.; Pacemakers and Implantable Cardiac Defibrillators: Software Radio Attacks and Zero-Power Defenses; IEEE Symposium on Security and Privacy; 2008.

Shafi Goldwasser et al.; Probabilistic Encryption; Journal of Computer and System Sciences; vol. 28, pp. 270-299; 1984.

Danny Dolev et al.; On the Security of Public Key Protocols; IEEE Transactions on Information Theory; vol. IT-29, No. 2; Mar. 1983.

C.E. Shannon; Communication Theory of Secrecy Systems; Bell System Technical Journal; vol. 29, pp. 656-715; 1949.

Ueli M. Maurer; Secret Key Agreement by Public Discussion From Common Information; IEEE Transactions on Information Theory; vol. 39, pp. 733-742; 1993.

Ueli M. Maurer; The Strong Secret Key Rate of Discrete Random Triples; Communication and Cryptography-Two Sides of One Tapestry; pp. 271-285; 1994.

Ueli Maurer et al.; Information-Theoretic Key Agreement: From Weak to Strong Secrecy for Free; Eurocrypt 2000, Lecture Notes in Computer Science; vol. 1807, pp. 351+; 2000.

Pedro C. Pinto et al.; Wireless Physical-Layer Security: The Case of Colluding Eavesdroppers; Proceedings IEEE International Symposium on Information Theory; Seoul, South Korea; pp. 2442-2446; Jul. 2009.

Alex Reznik et al.; Enhancing Wireless System Security with PHY-Layer Techniques; Proceedings Wireless World Research Forum; 19th Meeting; Nov. 2007.

Pedro C. Pinto et al.; Physical-Layer Security in Stochastic Wireless Networks; Proceedings IEEE Conference on Communication Systems; Guangzhou, China; pp. 974-979; Nov. 2008.

* cited by examiner

SECRET KEY GENERATION

FIELD OF THE INVENTION

The present invention relates generally to computer-based methods and apparatuses, including computer program products, for secret key generation.

BACKGROUND

Secure wireless networks are important for many military, commercial, and public service applications. However, standard methods for securing networks generally rely on the intractability of computationally equivalent problems (also referred to as computational methods of securing networks). Effective computational methods of securing networks rely on the computational limitations of the eavesdroppers attempting to break the security and the difficulty in decoding one-way functions. As a result, existing computational methods of securing networks do not, generally, provide unconditional security for the wireless networks. Thus, a need exists in the art for improved secret key generation.

SUMMARY

One embodiment to secret key generation is a method. The method includes receiving initialization data, the initialization data includes an initialization packet and a transmission path channel response; generating sample data based on the transmission path channel response; and generating a secret key based on the sample data utilizing a chaotic map.

In some embodiments, generating the sample data further includes sampling the transmission path channel response to identify a plurality of sample parts; decorrelating the identified plurality of sample parts; and normalizing the decorrelated plurality of sample parts to form the sample data. In some embodiments, the generating the processed sample data further includes sampling the transmission path channel response to identify a plurality of sample parts in the sample data.

In some embodiments, the sampling the transmission path channel response utilizes linear predictive coding. In some embodiments, the generating the secret key further includes separating the sample data into a plurality of sample parts; multiplying each of the plurality of sample parts with a noise factor; modifying each of the plurality of multiplied sample parts based on a key size; and combining each of the plurality of modified sample parts to form the secret key.

In some embodiments, the chaotic map is a binary shift map, a tent map, or a chaotic logistic map. In some embodiments, the method further includes transmitting a reciprocal initialization packet based on the initialization packet.

In some embodiments, the method further includes generating the reciprocal initialization packet based on an identification of the transmission path channel response in the initialization data, the reciprocal initialization packet is substantially the same as the initialization packet.

In some embodiments, the method further includes determining if a confirmation packet is received in response to the transmission of the reciprocal initialization packet; and transmitting a second initialization packet if the confirmation packet is not received. In some embodiments, the method further includes encrypting transmission payload data based on the secret key; and transmitting the encrypted payload data to a device used to transmit the initialization packet.

Another embodiment to the secret key generation is a computer program product. The computer program product is tangibly embodied in an information carrier. The computer program product includes instructions being operable to cause a data processing apparatus to receive initialization data, the initialization data includes an initialization packet and a transmission path channel response; generate processed sample data based on the transmission path channel response; and generate a secret key based on the processed sample data utilizing a chaotic map.

Another embodiment to the secret key generation is a system. The system includes a first device and a second device. The first device includes a first communication module configured to transmit an initialization packet and receive reciprocal initialization data, the reciprocal initialization data includes a reciprocal initialization packet and a reciprocal transmission path channel response; a first sample processing module configured to generate a first set of sample data based on the reciprocal transmission path channel response; and a first secret key generation module configured to generate first secret key based on the first set of sample data utilizing a first chaotic map. The second device includes a second communication module configured to transmit the reciprocal initialization packet and receive initialization data, the initialization data comprising the initialization packet and a transmission path channel response; a second sample processing module configured to generate a second set of sample data based on the transmission path channel response; and a second secret key generation module configured to generate a second secret key based on the second set of sample data utilizing a second chaotic map.

In some embodiments, the first secret key is the same as the second secret key. In some embodiments, the first chaotic map is the same as the second chaotic map.

In some embodiments, the first device further includes a first data stream encryption module configured to encrypt a data stream based on the first secret key; and the first communication module is further configured to transmit the encrypted data stream to the second device, and the second communication module is further configured to receive the encrypted data stream transmitted from the first device; and the second device further includes a second data stream encryption module configured to decrypt the received encrypted data stream based on the second secret key.

In some embodiments, the second data stream encryption module is further configured to encrypt a second data stream based on the second secret key and the second communication module is further configured to transmit the encrypted second data stream to the first device; and the first communication module is further configured to receive the second encrypted data stream transmitted from the second device and the first data stream encryption module is further configured to decrypt the received encrypted second data stream based on the first secret key.

In some embodiments, the first device further includes a first data stream encryption module configured to encrypt a confirmation packet based on the first secret key; and wherein the first communication module is further configured to transmit the encrypted confirmation packet to the second device, and wherein the second communication module is further configured to receive the encrypted confirmation packet transmitted from the first device; wherein the second device includes a second data stream encryption module configured to determine if the received encrypted confirmation packet is encrypted based on the second secret key; and an initialization generation module configured to generate a second initialization packet based on the determination if the received encrypted confirmation packet is encrypted based on the second secret key.

In some embodiments, the second communication module is further configured to transmit the second initialization packet to the first device. In some embodiments, the second device further includes an initialization generation module configured to generate the reciprocal initialization packet based on the initialization packet. In some embodiments, the first device is a first wireless communication device and the second device is a second wireless communication device.

The secret key generation technology described herein can provide one or more of the following advantages. An advantage to the secret key generation technology is the high probability of key agreement between authorized computing devices, thereby increasing the reliability of the communication between the computing devices and increasing the randomness and unpredictability of the communication from the perspective of an eavesdropper. Another advantage to the secret key generation technology is the computational efficiency of the handshaking process and/or key generation process, thereby decreasing the energy use of the computing devices. Another advantage to the secret key generation technology is the computational efficiency of the handshaking process and/or key generation process, thereby increasing the battery life of the computing devices. Another advantage to the secret key generation technology is the computational efficiency of the handshaking process and/or key generation process, thereby extending the effective usefulness of the technology to devices with low computational capabilities. Another advantage to the secret key generation technology is increased robustness of the security of the communication because of the use of information-theoretic information to generate the secret key.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The secret key generation method and apparatus includes technology that generates a secret key for secure communication between computing devices on a network (e.g., wireless network, wireless mesh network, wired network). The technology can be utilized to generate an information-theoretic security mechanism between computing devices for secure communication (e.g., encrypted communication, cryptosystem with shared key). The technology can be utilized on ad-hoc networks for military (e.g., tactical military environment, military base), commercial (e.g., wireless mesh sensor network within a factory, embedded sensor within a product), and/or public-service applications (e.g., implantable medical sensor, embedded road sensors) to advantageously reduce computational loads, reduce power consumption, increase battery life, and/or increase the level of security.

The technology can utilize a chaotic map scheme to generate the secret key based on a transmission path channel response between the computing devices. For example, in one embodiment, a secret key is generated based on the physical-layer noise that is picked up by the packets transmitted between the computing devices. In another embodiment, a secret key is generated based on the transmission reflections from the environment between the computing devices. Each computing device can generate a unique secret key based on the transmission path channel response since the transmission path channel response is generally unique between two computing devices. It is challenging, if not impossible, for a third party to eavesdrop on and/or correctly estimate the transmission path channel response.

The technology can include a handshaking process and a key-generation process as described herein. The low computational load of the technology described herein advantageously enables frequent, on-the-fly handshaking and key-generation processes (e.g., plurality of mobile computing devices, a single mobile computing device inter-connected to stationary computing devices).

Figure 1:
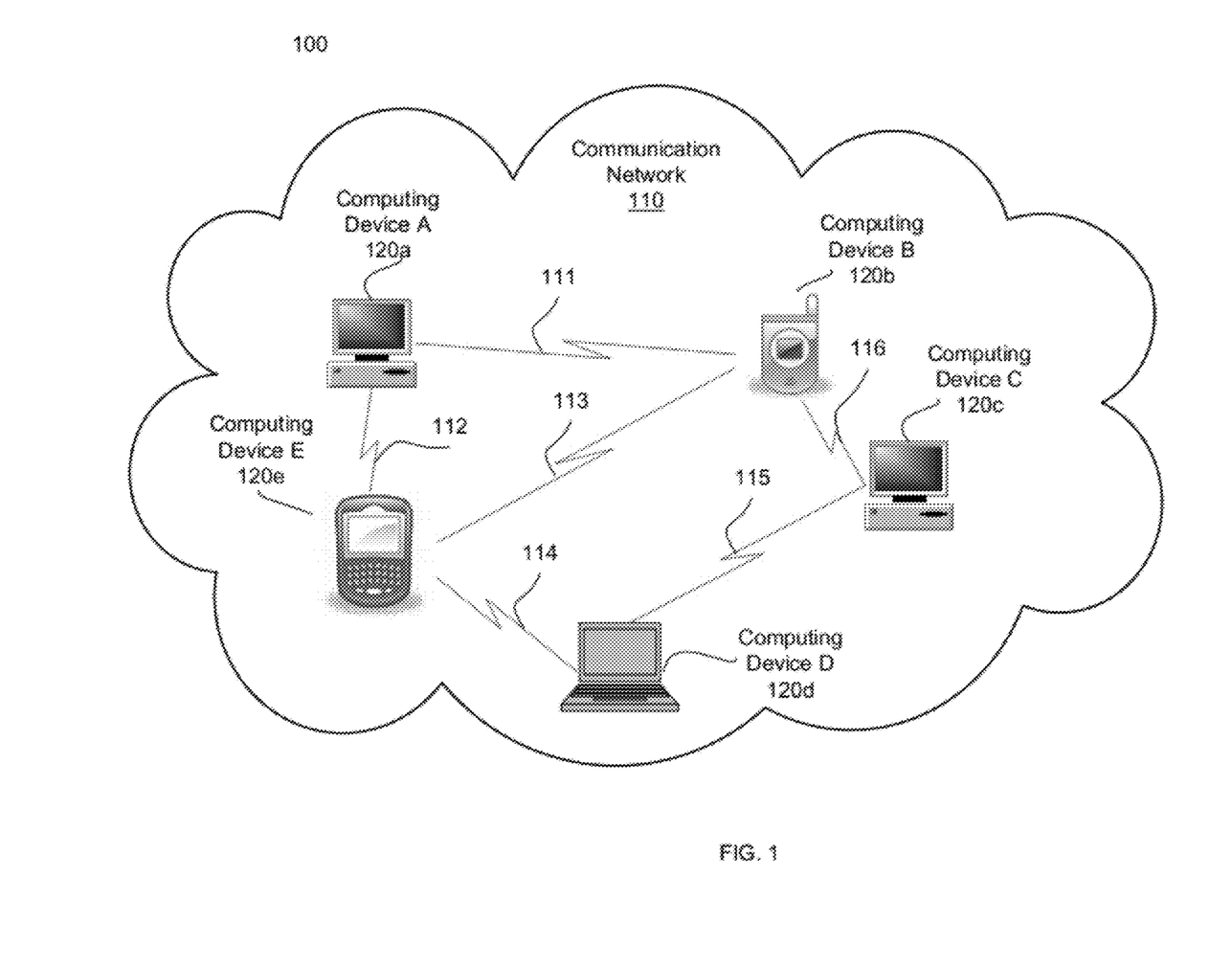
FIG. 1 is a block diagram of an exemplary computing environment.

FIG. 1 is a block diagram of an exemplary computing environment 100. The environment 100 includes a communication network 110 (e.g., wireless network, wired network) and a plurality of computing devices A 120a, B 120b, C 120c, D 120d, and E 120e (e.g., computer, laptop, mobile phone, personal digital assistant device, sensor, embedded device). The computing devices A 120a, B 120b, C 120c, D 120d, and E 120e communicate with each other as illustrated in FIG. 1 via a plurality of transmission paths 111, 112, 113, 114, 115, and 116. As illustrated in FIG. 1, the computing device A 120a and the computing device E 120e communicate with each other via the communication network 110 (e.g., wireless communication, wired communication) via the transmission path 112. However, as illustrated in FIG. 1, the computing device E 120e and the computing device C 120c do not communicate with each other directly. Instead, the computing device E 120e and the computing device C 120c communicate with each other via other intermediate computing devices (e.g., the computing device B 120b via the transmission paths 113 and 116; the computing device D 120d via the transmission paths 114 and 115).

The computing devices A 120a, B 120b, C 120c, D 120d, and E 120e can utilize the technology as described herein to establish secure communication pathways (e.g., cryptosystem communication, symmetric-key encryption, xor of communication packets). The computing devices A 120a, B 120b, C 120c, D 120d, and 120e can be stationary and/or moving. In one embodiment, one or more of the computing devices A 120a, B 120b, C 120c, D 120d, and E 120e are located in a building and have an established secure communication pathway that is maintained for a long period of time weeks, months). In another embodiment, one or more of the computing devices A 120a, B 120b, C 120c, D 120d, and E 120e are located in vehicles and are continuously establishing and re-establishing secure communication pathways between the devices (e.g., minutes, hours).

In this embodiment, the computing device A 120a and the computing device B 120b generate a secret key via the handshaking process and the key-generation process as described herein. The transmission path channel response between the computing device A 120a and the computing device B 120b is the unique physical-layer transmission of the environment (e.g., wireless signal interference in the environment, wireless signal bounces in the environment). In this example, the computing device A 120a and the computing device B 120b utilize the generated secret key for symmetric-key encryption of the data stream between the devices. Table 1 illustrates the exemplary communication pathways illustrated in FIG. 1 and the corresponding secret keys for each communication pathway.

TABLE 1

Exemplary Communication Pathways and Secret Keys

| Computing Device Pairs | Transmission Path Channel Response | Shared Secret Key |
|---|---|---|
| A 120a - E 120e | $Response_{AE}$ | ABC . . . T23A |
| A 120a - B 120b | $Response_{AB}$ | LJH . . . 126a |
| E 120e - D 120d | $Response_{ED}$ | hUY . . . ER32 |
| D 120d - C 120c | $Response_{DC}$ | POd . . . WE32 |
| C 120c - B 120b | $Response_{CB}$ | Tha . . . 5981 |
| B 120b - E 120e | $Response_{BE}$ | YTa . . . qwe3 |

Although Table 1 illustrates shared secret keys for the computing device pairs that communicate directly with each other, as illustrated in FIG. 1, the technology as described herein can generate a secret key for computing device pairs that communicate through another device. In one embodiment, the technology cart generate a shared secret key for computing device A 120a and computing device C 120c. In this embodiment, the computing device B 120b routes the communication between the computing device A 120a and the computing device C 120c. In this embodiment, the transmission path channel response is $Response_{AB}+Response_{BC}$.

Figure 2:
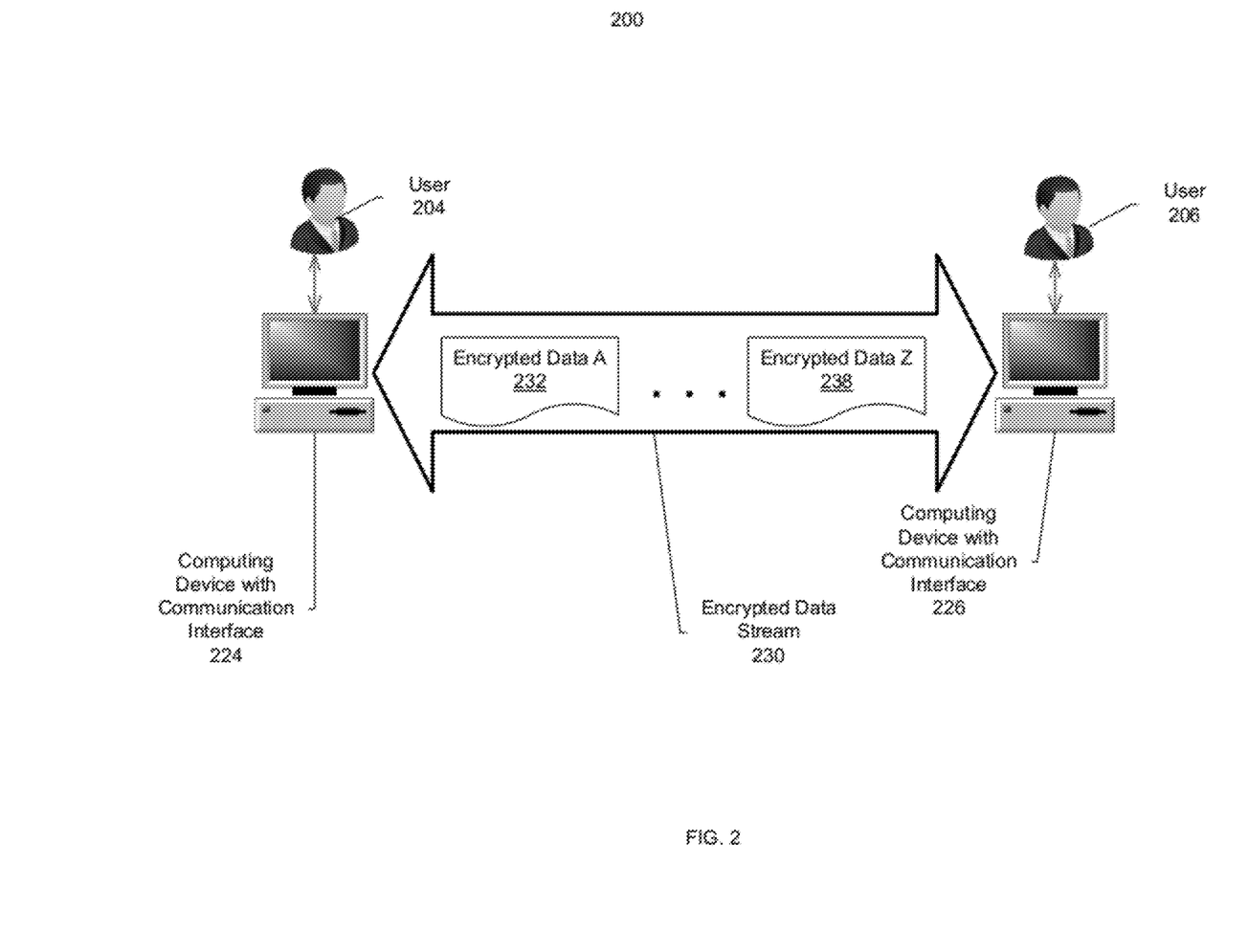
FIG. 2 is a block diagram of an exemplary encrypted data stream between computing devices.

FIG. 2 is a block diagram of an exemplary encrypted data stream between computing devices within a computing environment 200. The environment 200 includes two computing devices 224 and 226. The computing devices 224 and 226 include a communication interface for user 204 and 206, respectively, to interact with the computing devices 224 and 226. The communication interfaces enable the user 204 or 206 to send email communication, personal information, inventory information, and/or any other type of communication between the computing devices 224 and 226. After the computing, devices 224 and 226 generate a secret key via the handshaking process and the key-generation process as described herein, the computing devices 224 and 226 can each transmit and receive an encrypted data stream 230 from each other utilizing the secret key. The encrypted data stream 230 includes a plurality of encrypted data A 232 through Z 238. The encrypted data stream 230 can be encrypted utilizing any known encryption technique (e.g., blowfish, data encryption standard, xor operation of data, block cipher, one-time pad) based on the secret key. In some embodiments, the secret key can be used one time for the transmission of secure information. In some embodiments, a new secret key must be generated for each subsequent communication after the one time use. Some embodiments, the secret key can be used continuously for the transmission of secure information.

Figure 3:
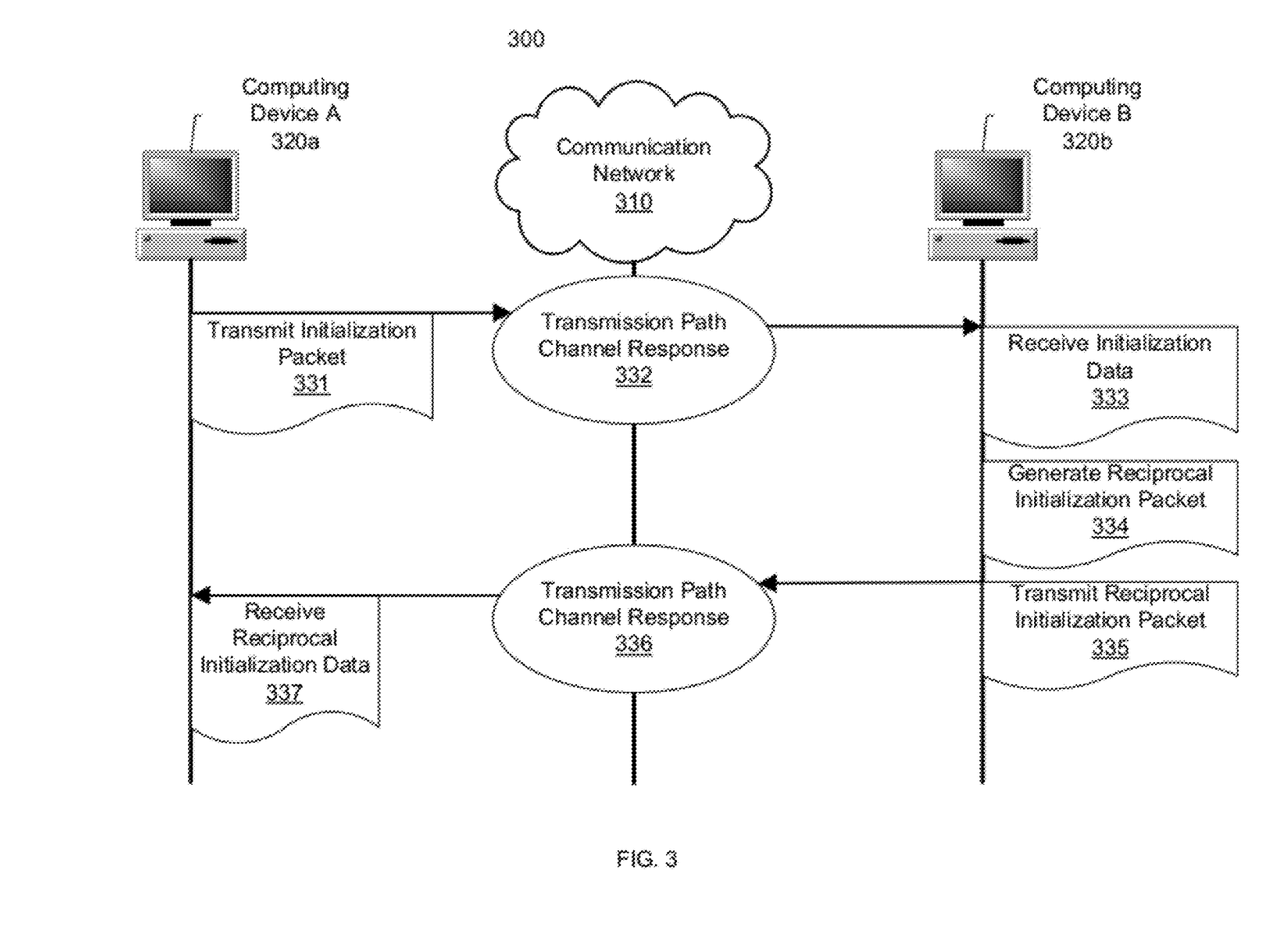
FIG. 3 is a process diagram of an exemplary initialization process between computing devices.

FIG. 3 is a process diagram of an exemplary initialization process 300 (also referred to as a handshaking process) between computing devices A 320a and B 320b. The computing device A 320a transmits (step 331) an initialization packet via a communication network 310 (e.g., wireless mesh network, wireless network, wired network). The transmission process via the communication network 310 modifies the initialization packet and a transmission path channel response 332 is added to the initialization packet to form initialization data (e.g., signal addition in the physical-layer, signal bouncing off of physical objects within the environment). The computing device B 320b receives (step 333) the initialization data. The initialization data is a combination of the initialization packet and the transmission path channel response 332.

The computing device B 320b generates (step 334) a reciprocal initialization packet based on the initialization packet (e.g., the reciprocal initialization packet is identical to the initialization packet, the reciprocal initialization packet is substantially identical to the initialization packet except for a time stamp) and transmits (step 335) the reciprocal initialization packet via the communication network 310. The transmission process via the communication network 310 modifies the reciprocal initialization packet and a reciprocal transmission path channel response 336 is added to the reciprocal initialization packet to form reciprocal initialization data. The computing device A 320a receives (step 337) the reciprocal initialization data.

Table 2 illustrates exemplary initialization packets and data communicated between the computing devices of FIG. 1. The noise in the initialization data is the same or substantially the same as the noise in the reciprocal initialization data since the transmission path channels are the same. In other words, the transmission path channel has reciprocity in that the transmission path channel response is identical or substantially the same in each direction (e.g., $Response_{AE}=Response_{EA}$). As a result, different noises are measured by another computing device (e.g., computing device B 120b). The other computing device is generally unable to determine the transmission path channel response between other computing devices because the noise is subjected to different noise based on the individual locations of the computing devices (e.g., different locations have different environmental noises).

TABLE 2

Exemplary Initialization Packets and Data

| Computing Device Pairs | Initialization Packet | Initialization Data | Reciprocal Initialization Packet | Reciprocal Initialization Data |
|---|---|---|---|---|
| A 120a - E 120e | $Packet_{AE}$ | $Packet_{AE}+Response_{AE}$ | $Packet_{EA}$ | $Packet_{EA}+Response_{EA}$ |
| A 120a - B 120b | $Packet_{AB}$ | $Packet_{AB}+Response_{AB}$ | $Packet_{BA}$ | $Packet_{BA}+Response_{BA}$ |
| E 120e - D 120d | $Packet_{ED}$ | $Packet_{ED}+Response_{ED}$ | $Packet_{DE}$ | $Packet_{DE}+Response_{DE}$ |
| D 120d - C 120c | $Packet_{DC}$ | $Packet_{DC}+Response_{DC}$ | $Packet_{CD}$ | $Packet_{CD}+Response_{CD}$ |
| C 120c - B 120b | $Packet_{CB}$ | $Packet_{CB}+Response_{CB}$ | $Packet_{BC}$ | $Packet_{BC}+Response_{BC}$ |
| B 120b - E 120e | $Packet_{BE}$ | $Packet_{BE}+Response_{BE}$ | $Packet_{EB}$ | $Packet_{EB}+Response_{EB}$ |

Figure 4:
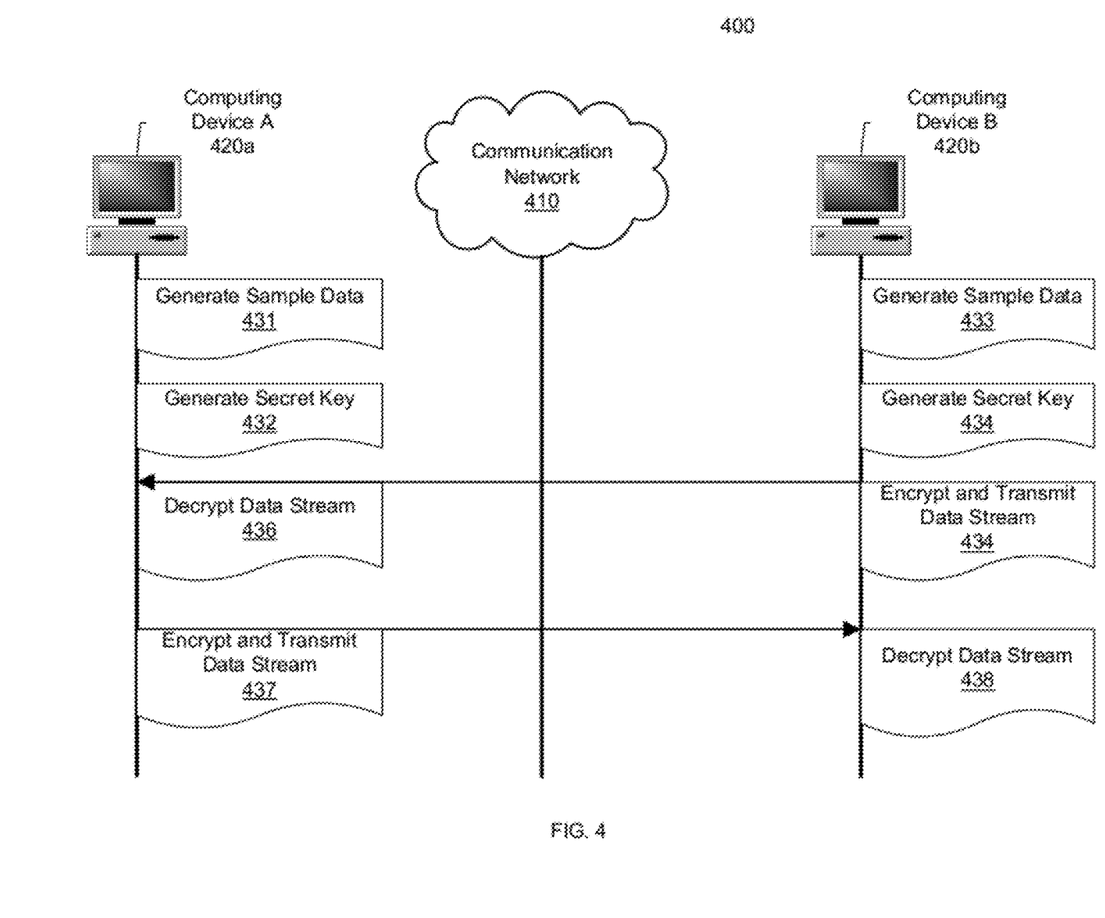
FIG. 4 is a process diagram of an exemplary communication process between computing devices.

FIG. 4 is a process diagram of an exemplary communication process 400 (also referred to as key generation process) between computing devices A 420a and B 420b. The computing device A 420a generates (431) sample data based on a received transmission path channel response (e.g., received via the initialization process 300 of FIG. 3) and generates (432) a secret key based on the sample data utilizing a chaotic map. The chaotic map can be any type of function that is sensitive to initial conditions causing long-term prediction to be challenging, if not impossible. The computing device B 420b generates (433) sample data based on a received transmission path channel response (e.g., received 333 via the initialization process 300 of FIG. 3) and generates (434) a secret key based on the sample data utilizing a chaotic map. The computing devices A 420a and B 420b can generate the sample data and/or the secret key independently from each other (e.g., the computing devices A 420*a* and B 420*b* generate the secret key in parallel, the computing devices A 420*a* generates the secret key first and then the computing device B 420*a* generates the secret key).

In some embodiments, the computing device A 420*a* generates (432) the same secret key as is generated (434) by the computing device B 420*b* producing the same secret keys. In some embodiments, the secret keys are substantially the same (e.g., 99% the same, same except for some number of insignificant bits). In some embodiments, the pair of computing devices can agree on a short secret key (e.g., first two hundred bits of the secret key) and ignore the other parts of the generated secret key for the secure communication mechanism.

In some embodiments, the computing device A 420*a* generates (432) the secret key utilizing the same chaotic map as the computing device B 420*b* utilizes to generate (434) the secret key. In these embodiments, the chaotic maps are the same (e.g., both chaotic maps are tent maps)

In some embodiments, the computing devices A 420*a* and B 420*b* are wireless communication devices (e.g., implantable medical device, sensor device, cell phone). In these embodiments, the computing device A 420*a* is a desktop computer and the computing device B 420*h* is a heart monitor implanted into a person. The desktop computer and the heart monitor communicate utilizing the technology as described herein.

Figure 5:
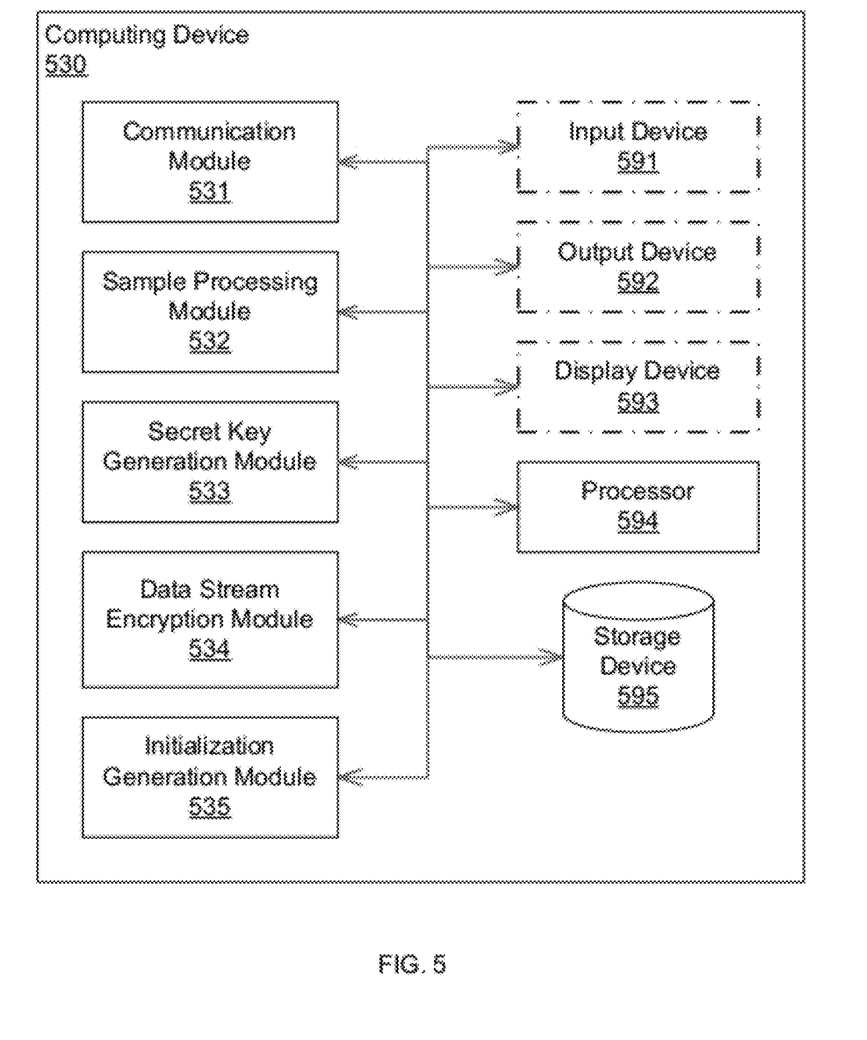
FIG. 5 is a block diagram of an exemplary computing device.

FIG. 5 is a block diagram of an exemplary computing device 530. The computing device 530 includes a communication module 531, a sample processing module 532, a secret key generation module 533, a data stream encryption module 534, an initialization generation module 535, an input device 591, an output device 592, a display device 593, a processor 594, and a storage device 595. The modules and devices described herein can, for example, utilize the processor 594 to execute computer executable instructions and/or include another processor to execute computer executable instructions (e.g., an encryption processing unit, a field programmable gate array processing unit). It should be understood that the computing device 530 can include, for example, other modules, devices, and/or processors known in the art and/or varieties of the illustrated modules, devices, and/or processors.

The communication module 531 transmits an initialization packet (also referred to as a hello packet) and receives reciprocal initialization data. The reciprocal initialization data includes a reciprocal initialization packet and a reciprocal transmission path channel response (e.g., observational noise, signal convolution, environmental noise). The initialization packet can be pre-defined set for all computing devices, set for each group of computing devices) and/or dynamically created (e.g., created based on the environment, created based on the type of computing, device). In some embodiments, the communication module 531 transmits an encrypted data stream and/or an encrypted confirmation packet to another computing device (not shown). In some embodiments, the communication module 531 receives an encrypted data stream and/or an encrypted confirmation packet from another computing device (not shown.

In some embodiments, the communication module 531 transmits a reciprocal initialization packet to another computing device (not shown and receives initialization data from the other computing device (not shown). The initialization data includes an initialization packet and a transmission path channel response.

The sample processing module 532 generates a set of sample data based on the transmission path channel response and/or the reciprocal transmission path channel response. The secret key generation module 533 generates a secret key based on the set of sample data utilizing a chaotic map.

The data stream encryption module 534 encrypts a data stream (e.g., received from the processor 594, received from the storage device 595) based on the secret key and/or decrypts a received encrypted data stream based on the secret key. In some embodiments, the data stream encryption module 534 encrypts a confirmation packet packet confirming receipt of other data, packet setting up a data stream) based on the secret key and/or decrypts a confirmation packet based on the secret key. In some embodiments, the data stream encryption module 534 determines if the received encrypted confirmation packet is encrypted based on the secret key.

The initialization generation module 535 generates an initialization packet based on the determination of whether the received encrypted confirmation packet is encrypted based on the secret key. In some embodiments, the initialization generation module 535 generates the reciprocal initialization packet based on the initialization packet.

The input device 591 receives information associated with the computing device 530 (e.g., instructions from a user, instructions from another computing device) from a user (not shown and/or another computing system (not shown). The input device 591 can include, for example, a keyboard, or a scanner. The output device 592 outputs information associated with the computing device 530 (e.g., information to a printer (not shown), information to a speaker).

The display device 593 displays information associated with the computing device 530 (e.g., status information, configuration information). In some embodiments, the display device 593 displays the encryption status and/or any other information associated with the computing device 530 to an operator. The processor 594 executes the operating system and/or any other computer executable instructions for the computing device 530 executes applications, encrypts data).

The storage device 595 stores the received data (e.g., encrypted data, initialization packet), the secret key, and/or any other data associated with the computing device 530. The storage device 595 can store image information and/or any other data associated with the computing device 530. The storage device 595 can include a plurality of storage devices and/or the computing device 530 can include a plurality of storage devices (e.g., a key storage device, a data storage device). The storage device 595 can include, for example, tong-term storage (e.g., a hard drive, a tape storage device, flash memory), short-term storage (e.g., a random access memory, a graphics memory), and/or any other type of computer readable storage.

Figure 6:
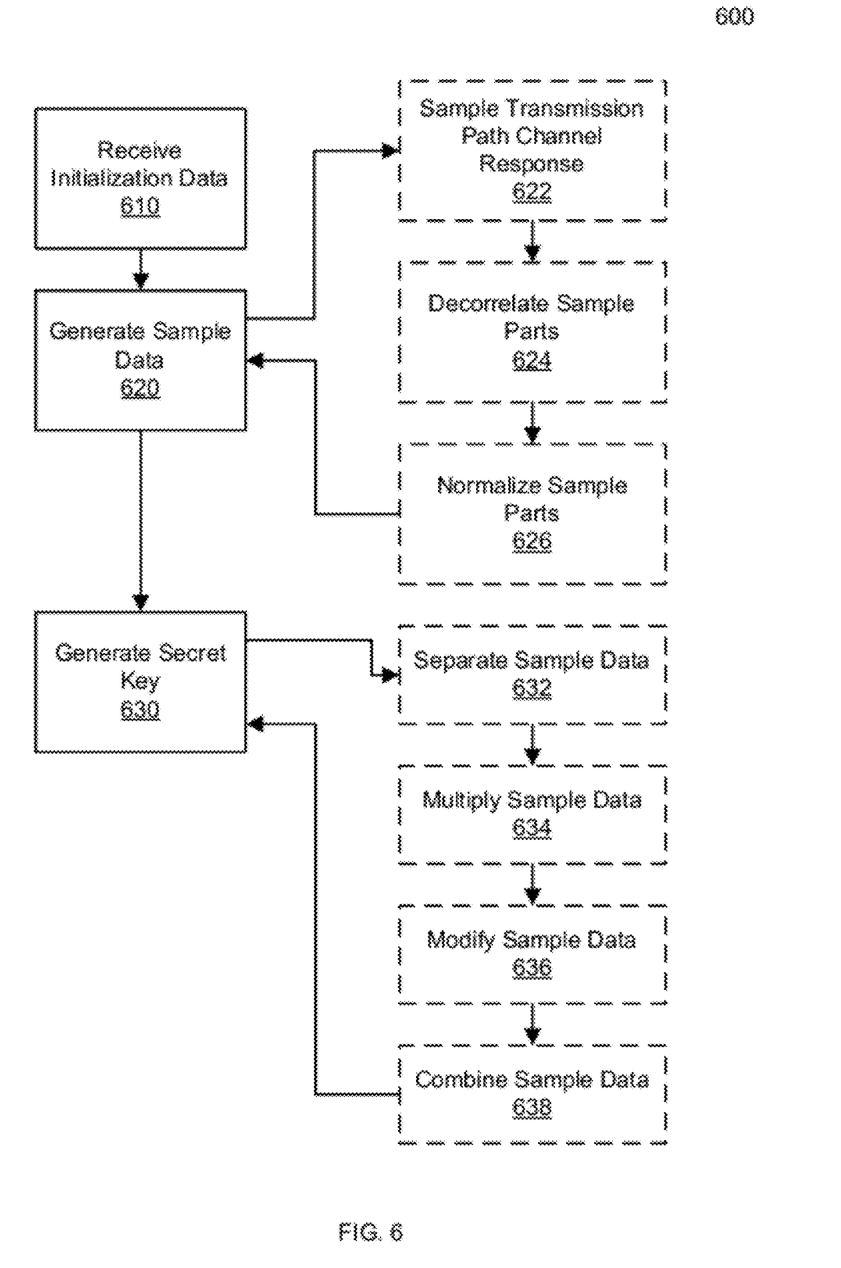
FIG. 6 is a flowchart of an exemplary secret key generation process.

FIG. 6 is a flowchart of an exemplary secret key generation process 600 utilizing, for example, the computing device 530 of FIG. 5. The communication module 531 receives (610) initialization data. The initialization data includes an initialization packet (e.g., transmission control protocol packet, user datagram protocol packet) and a transmission path channel response (e.g., operational noise, environmental noise). The sample processing module 532 generates (620) sample data based on the transmission path channel response. The secret key generation module 533 generates (630) a secret key based on the sample data utilizing a chaotic map.

In some embodiments, generating (620) the sample data includes the optional steps 622, 624, and 626 to further optimize the generation process. The sample processing module 532 samples (622) the transmission path channel response to identify a plurality of sample parts (e.g., sample parts are based on a pre-defined time period, sample parts are based on a frequency range). The sample processing module 532 decorrelates (624) the identified plurality of sample parts (e.g., using a matched linear filter). The sample processing module 532 normalizes (626) the decorrelated plurality of sample parts to form the sample data (e.g., using a linear predictive coder).

In some embodiments, generating (630) the secret key includes the optional steps 632, 634, 636, and 638 to further optimize the generation process. The secret key generation module 533 separates (632) the sample data into a plurality of sample parts separate each normalized sample). The secret key generation module 533 multiplies (634) each of the plurality of sample parts with a noise factor. The secret key generation module 533 modifies (636) each of the plurality of multiplied sample parts based on a key size. The secret key generation module 533 combines (638) each of the plurality of modified sample parts to form the secret key (e.g., concatenates each of the multiplied sample parts). Table 3 illustrates exemplary sample parts through this process.

TABLE 3

Exemplary Sample Parts

| Computing Device Pairs | Sample Data | Separated Sample Parts | Multiplied Sample Parts | Modified Sample Parts | Secret Key |
|---|---|---|---|---|---|
| A 120a - E 120e | $x_{AE}$ | $x_{AE1}, x_{AE2}, x_{AE3}, \ldots x_{AE99}$ | $y_{AE1}, y_{AE2}, y_{AE3}, \ldots y_{AE99}$ | $k_{AE1}, k_{AE2}, k_{AE3}, \ldots k_{AE99}$ | $k_{AE1}k_{AE2}k_{AE3} \ldots k_{AE99}$ |
| A 120a - B 120b | $x_{AB}$ | $x_{AB1}, x_{AB2}, x_{AB3}, \ldots x_{AB55}$ | $y_{AB1}, y_{AB2}, y_{AB3}, \ldots y_{AB55}$ | $k_{AB1}, k_{AB2}, k_{AB3}, \ldots k_{AB55}$ | $k_{AB1}k_{AB2}k_{AB3} \ldots k_{AB99}$ |
| E 120e - D 120d | $x_{ED}$ | $x_{ED1}, x_{ED2}, x_{ED3}, \ldots x_{ED125}$ | $y_{ED1}, y_{ED2}, y_{ED3}, \ldots y_{ED125}$ | $k_{ED1}, k_{ED2}, k_{ED3}, \ldots k_{ED125}$ | $k_{ED1}k_{ED2}k_{ED3} \ldots k_{ED99}$ |

The separation, multiplication, modification, and combination of the sample data advantageously magnifies the differences between two sets of closely related sample data, thereby increasing the security of the secret key. In other words, if a third party computing device attempts to estimate the transmission path channel response between a pair computing devices, any differences between the estimated transmission path channel response and the actual transmission path channel response is magnified by the this process. For example, if the actual Response$_{AE}$ is 10 dB and the estimated Response$_{AE}$ is 11 dB, the difference between the generated secret keys (in this example, $k_{AE1}k_{AE2}k_{AE3} \ldots k_{AE99}$ and $k_{AE'1}k_{AE'2}k_{AE'3} \ldots k_{AE'99}$) based on these noises is substantially greater than the 1 dB difference in the actual and normal noise in this example, the difference between the keys is magnified by performing steps 632, 634, 636, and 638).

In some embodiments, the secret key generation module 533 multiplies (634) each of the plurality of sample parts with a noise factor in accordance with the following equation:
For each sample part, x:

$$y = c^N(x)$$

where
$c:[0,1] \to [0,1]$
$c^N(x)$ is a N times composition function.

In some embodiments, the N time composition function ($c^N(x)$) is determined by an analysis of the observational noise in an environment (e.g., the average observational noise in a factory environment, the average observational noise between computing devices G and H). In some embodiments, N is determined by an analysis of the environment (e.g., the average observational noise estimation by an eavesdropper, estimated allowable error for reliability, estimated unpredictability, estimated randomness). In some embodiments, the $C^N$ (X) is defined as c(x)=4x (1−x). In some embodiments, N decreases as the average observational noise estimation by an eavesdropper increases. In some embodiments, N decreases as the estimated unpredictability and/or estimated randomness increases. In some embodiments, N is 3-5.

In some embodiments, the secret key generation module 533 modifies (636) each of the plurality of multiplied sample parts based on a key size in accordance with the following equation:
For each multiplied sample part, y:

$$q: [0,1] \times N \to \{1, 2, \ldots, 2^L\}$$

where
L is the key size.

In some embodiments, the secret key generation module 533 modifies (636) each of the plurality of multiplied sample parts based on the key size (L) in accordance with the following equation:
For each multiplied sample part, v:

$$q(y, L) = \begin{cases} [2^{L+1} \arcsin(\sqrt{y})], & y \in (0, 1) \\ 1, & y = 0 \end{cases}$$

where
L is the key size.

In some embodiments, the values of the key sizes N and L, as described herein, are predefined. In some embodiments, the N and L, as described herein, are dynamically configured based on the operating environment (e.g., stationary computing devices, moving computing devices).

In some embodiments, the sample processing module 532 samples the transmission path channel response to identify a plurality of sample parts in the sample data. The sampling of the transmission path channel response can utilize, for example, linear predictive coding. In some embodiments, the chaotic map is a binary shift map, a tent map, a chaotic logistic map, and/or any other type of chaotic map.

In some embodiments, the communication module 531 transmits a reciprocal initialization packet based on the initialization packet. In some embodiments, the initialization generation module 535 generates the reciprocal initialization packet based on an identification of the transmission path channel response in the initialization data. The reciprocal initialization packet can be substantially the same as the initialization packet (e.g., the same except for four leading bits, the same except for four trailing bits, 99% identical).

In some embodiments, the initialization generation module 535 determines if a confirmation packet is received in response to the transmission of the reciprocal initialization packet. If no confirmation packet is received, the communication module 531 transmits a second initialization packet (also referred to as a time-out process).

In some embodiments, the data stream encryption module 534 encrypts transmission payload data based on the secret key. The communication module 531 transmits the encrypted payload data to a device used to transmit the initialization packet.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback).

Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method, executed by one or more processors, for generating a secret key, the method comprising:
   receiving initialization data via a transmission path channel, the initialization data comprises an initialization packet and a transmission path channel response of the transmission path channel;
   transmitting a reciprocal initialization packet based on the initialization packet and determining a confirmation that the reciprocal initialization packed is received in response to the transmission of the reciprocal initialization packet wherein the reciprocal initialization packet is generated based on an identification of the transmission path channel response in the initialization data;
   generating sample data based on the transmission path channel response; and
   generating a secret key based on the sample data utilizing a chaotic map to remove information intelligible to a potential eavesdropper from the sample data,
   wherein generating the sample data further comprises sampling the transmission path channel response to identify a plurality of sample parts in the sample data.

2. The method of claim 1, wherein generating the sample data farther comprises:
   sampling the transmission path channel response to identify a plurality of sample parts;
   decorrelating the identified plurality of sample parts; and
   normalizing the decorrelated. plurality of sample parts to form the sample data.

3. The method of claim 1, wherein sampling the transmission path channel response utilizes linear predictive coding.

4. The method of claim 1, wherein generating the secret key further comprises:
   separating the sample data into a plurality of sample parts;
   multiplying each of the plurality of sample parts with a noise factor;
   modifying each of the plurality of multiplied sample parts based on a key size; and
   combining each of the plurality of modified sample parts to form the secret key.

5. The method of claim 1, wherein the chaotic map is a binary shift map, a tent map, or a chaotic logistic map.

6. The method of claim 1, further comprising transmitting a reciprocal initialization packet based on the initialization packet.

7. The method of claim 1, wherein the reciprocal initialization packet is substantially the same as the initialization packet.

8. (The method of claim 1, wherein:
   the determining if the reciprocal initialization packed is received includes determining if a confirmation packet is received in response to the transmission of the reciprocal initialization packet; and
   the method further comprising transmitting a second initialization packet if the confirmation packet is not received.

9. The method of claim 1, further comprising:
   encrypting transmission payload data based on the secret key; and
      transmitting the encrypted payload data to a device used to transmit the initialization packet.

10. A computer program product, tangibly embodied in a non-transitory information carrier, the computer program product including instructions when executed, cause a data processing apparatus to:
   receive initialization data via a transmission bath channel, the initialization data comprising an initialization packet and a transmission path channel response of the transmission path channel;
   transmit a reciprocal initialization packet based on the initialization packet and determine a confirmation that the reciprocal initialization packed is received in response to the transmission of the reciprocal initialization packet wherein the reciprocal initialization packet is generated based on an identification of the transmission path channel response in the initialization data;
   generate processed sample data based on the transmission path channel response; and
   generate a secret key based on the processed sample data utilizing a chaotic map to remove information intelligible to a potential eavesdropper from the sample data,
   wherein generating the sample data further comprises sampling the transmission path channel response to identify a plurality of sample parts in the sample data.

11. A system for generating a secret key, the system comprising:
   a first device comprising:
      a processor;
      a memory, with stored instructions that are executable by the processor;
      a first communication module stored in the memory of the first device and configured to transmit an initialization packet via a transmission path channel and receive reciprocal initialization data, the reciprocal initialization data comprises a reciprocal initialization packet and a reciprocal transmission path channel response of the transmission path channel;
      a first sample processing module stored in the memory of the first device and configured to generate a first set of sample data based on the reciprocal transmission path channel response; and
      a first secret key generation module stored in the memory of the first device and configured to generate a first secret key based on the first set of sample data utilizing a first chaotic map to remove information intelligible to a potential eavesdropper from the sample data, and a second device comprising:
      a processor;
      a memory, with stored instructions that are executable by the processor;
      a second communication module stored in the memory of the second device and configured to transmit the reciprocal initialization packet via the transmission path channel and receive initialization data, the initialization data comprising the initialization packet and a transmission path channel response of the transmission path channel;
      a second sample processing module stored in the memory of the second device and configured to generate a second set of sample data based on the transmission path channel response; and
      a second secret key generation module stored in the memory of the second device and configured to generate a second secret key based on the second set of sample data utilizing a second chaotic map to remove information intelligible to a potential eavesdropper from the sample data, wherein generating the sample data further comprises sampling the transmission path channel response to identify a plurality of sample parts in the sample data.

12. The system of claim 11, wherein the first secret key is the same as the second secret key.

13. The system of claim 11, wherein the first chaotic map is the same as the second chaotic map.

14. The system of claim 11,
wherein the first device further comprises a first data stream encryption module stored in the memory of the first device and configured to encrypt a data stream based on the first secret key; and
wherein the first communication module is further configured to transmit the encrypted data stream to the second device, and
wherein the second communication module is further configured to receive the encrypted data stream transmitted from the first device; and
wherein the second device further comprises a second, data stream encryption module configured to decrypt the received encrypted data stream based on the second secret key.

15. The system of claim 14,
wherein the second data stream encryption module is further configured to encrypt a second data stream based on the second secret key and the second communication module is further configured to transmit the encrypted second data stream to the first device; and
wherein the first communication module is further configured to receive the second encrypted data stream transmitted from the second device and the first data stream encryption module is further configured to decrypt the received encrypted second data stream based on the first secret key.

16. The system of claim 11,
wherein the first device further comprises a first data stream encryption module stored in the memory of the first device and configured to encrypt a confirmation packet based on the first secret key; and
wherein the first communication module is further configured to transmit the encrypted confirmation packet to the second device, and
wherein the second, communication module is further configured to receive the encrypted confirmation packet transmitted from the first device;
wherein the second device comprises:
a second data stream encryption module stored in the memory of the second device and configured to determine if the received encrypted confirmation packet is encrypted based on the second secret key; and
an initialization generation module stored in the memory of the second device and configured to generate a second initialization packet based on the determination if the received encrypted confirmation packet is encrypted based on the second secret key.

17. The system of claim 16, wherein the second communication module is further configured to transmit the second initialization packet to the first device.

18. The system of claim 11, wherein the second device further comprises:
an initialization generation module stored in the memory of the second device and configured to generate the reciprocal initialization packet based on the initialization packet.

19. The system of claim 11, wherein the first device is a first wireless communication device and the second device is a second wireless communication device.

* * * * *